US012601910B2

(12) United States Patent
Zhu

(10) Patent No.: US 12,601,910 B2
(45) Date of Patent: Apr. 14, 2026

(54) ROTATION ANGLE CORRECTION METHOD, DEVICE OF ROTARY MIRROR, AND SCANNING METHOD AND SYSTEM

(71) Applicant: Beijing Xunheng Technology Co., Ltd., Beijing (CN)

(72) Inventor: Hongde Zhu, Beijing (CN)

(73) Assignee: Beijing Xunheng Technology Co., Ltd., Beijing (CN)

( * ) Notice: Subject to any disclaimer, the term of this patent is extended or adjusted under 35 U.S.C. 154(b) by 393 days.

(21) Appl. No.: 18/517,289

(22) Filed: Nov. 22, 2023

(65) Prior Publication Data

US 2025/0130420 A1     Apr. 24, 2025

(30) Foreign Application Priority Data

Oct. 23, 2023    (CN) ......................... 202311374350.X

(51) Int. Cl.
*G02B 27/00*        (2006.01)
*G02B 27/14*        (2006.01)
*G06T 15/06*        (2011.01)

(52) U.S. Cl.
CPC ......... *G02B 27/0025* (2013.01); *G02B 27/14* (2013.01); *G06T 15/06* (2013.01)

(58) Field of Classification Search
CPC ...... G02B 5/09; G02B 27/0025; G02B 27/14; G06T 15/06
USPC .................................... 359/216.1, 220.1, 838
See application file for complete search history.

(56) References Cited

U.S. PATENT DOCUMENTS

| | | | | | |
|---|---|---|---|---|---|
| 3,848,087 | A | * | 11/1974 | Carrell | ..................... H04N 3/08 |
| | | | | | 347/261 |
| 4,806,946 | A | * | 2/1989 | Ohnishi | ............... H04N 1/4056 |
| | | | | | 347/252 |
| 5,072,091 | A | * | 12/1991 | Nagata | ................... B23K 26/06 |
| | | | | | 219/121.75 |

(Continued)

FOREIGN PATENT DOCUMENTS

| | | |
|---|---|---|
| CN | 102650737 | 12/2014 |
| CN | 108253937 A | 7/2018 |

(Continued)

OTHER PUBLICATIONS

Hao Zhou et al., "Analysis of Internal Angle Error of UAV LiDAR Based on Rotating Mirror Scanning", Remote Sensing, vol. 14, Issue No. 20, p. 5260, Oct. 20, 2022.

*Primary Examiner* — Ricky D Shafer
(74) *Attorney, Agent, or Firm* — MagStone Law, LLP; Enshan Hong

(57)        ABSTRACT

A rotation angle correction method comprises: obtaining a plurality of light stripe images cast to a reference target screen under different graduations and corresponding rotation graduation information; based on the light stripe images and corresponding rotation graduation information, obtaining a first mapping relationship; based on the first mapping relationship and the rotation graduation information, correcting coordinate information of the structured light. Based on the corrected coordinate information of the structured light and the rotation graduation information, one may cast the structured light to irradiate a scanned target and collect images, so as to complete the scanning and thus optimize a scanning result and improve a scanning analysis accuracy.

12 Claims, 4 Drawing Sheets

(56)     References Cited

U.S. PATENT DOCUMENTS

| | | | | |
|---|---|---|---|---|
| 5,177,532 A * | 1/1993 | Takagi | ................. | G03B 27/727 |
| | | | | 355/38 |
| 5,812,299 A * | 9/1998 | Minakuchi | ........... | G02B 26/124 |
| | | | | 347/261 |
| 5,870,220 A * | 2/1999 | Migdal | ................. | G02B 26/12 |
| | | | | 250/559.22 |
| 5,991,437 A | 11/1999 | Migdal et al. | | |
| 7,152,798 B2 | 12/2006 | Cannon et al. | | |
| 9,492,889 B2 * | 11/2016 | Suzuki | ................. | B23K 26/067 |
| 2001/0012043 A1 * | 8/2001 | Yamawaki | ........... | G02B 26/124 |
| | | | | 347/256 |
| 2006/0203318 A1 * | 9/2006 | Yamawaki | ........... | G02B 26/124 |
| | | | | 359/216.1 |
| 2008/0122460 A1 * | 5/2008 | Ichikawa | ........... | G03G 15/5037 |
| | | | | 324/699 |
| 2016/0065945 A1 | 3/2016 | Yin et al. | | |
| 2017/0041577 A1 * | 2/2017 | Nishimura | ............. | G02B 23/24 |

FOREIGN PATENT DOCUMENTS

| | | | |
|---|---|---|---|
| CN | 113567956 B | 1/2023 |
| CN | 115407362 B | 2/2023 |
| EP | 0320915 B1 | 3/1994 |
| JP | H0828797 B2 | 3/1996 |
| JP | 2013025232 A | 2/2013 |
| KR | 100596745 B1 | 7/2006 |
| KR | 20080109474 A | 12/2008 |
| KR | 20230057614 A | 5/2023 |
| WO | 2014169273 A1 | 10/2014 |
| WO | 2017189185 A1 | 11/2017 |

* cited by examiner

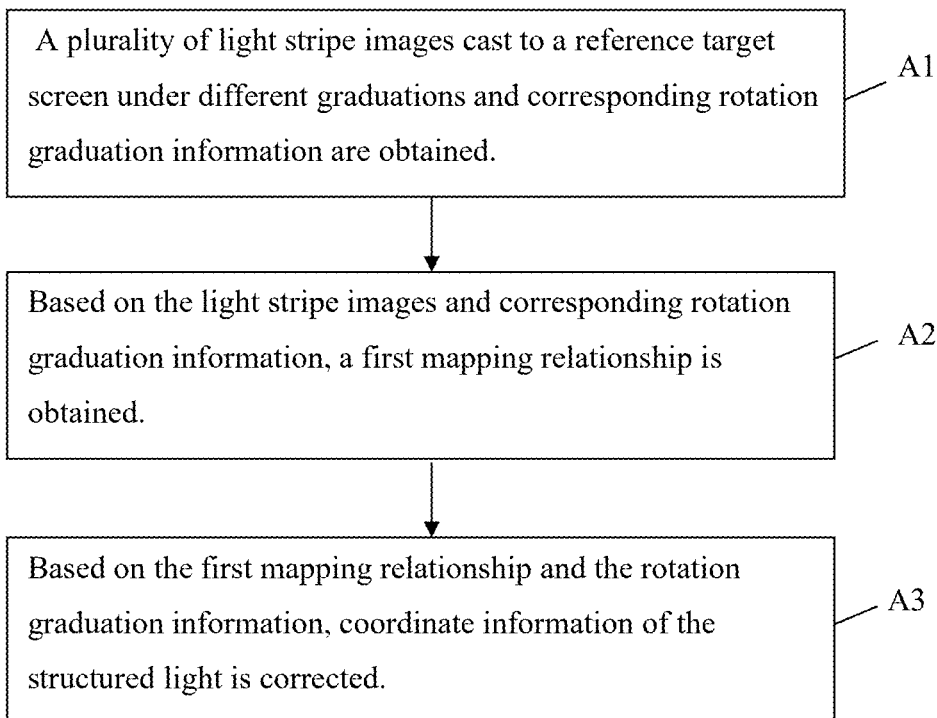

A plurality of light stripe images cast to a reference target screen under different graduations and corresponding rotation graduation information are obtained. — A1

Based on the light stripe images and corresponding rotation graduation information, a first mapping relationship is obtained. — A2

Based on the first mapping relationship and the rotation graduation information, coordinate information of the structured light is corrected. — A3

FIG. 1

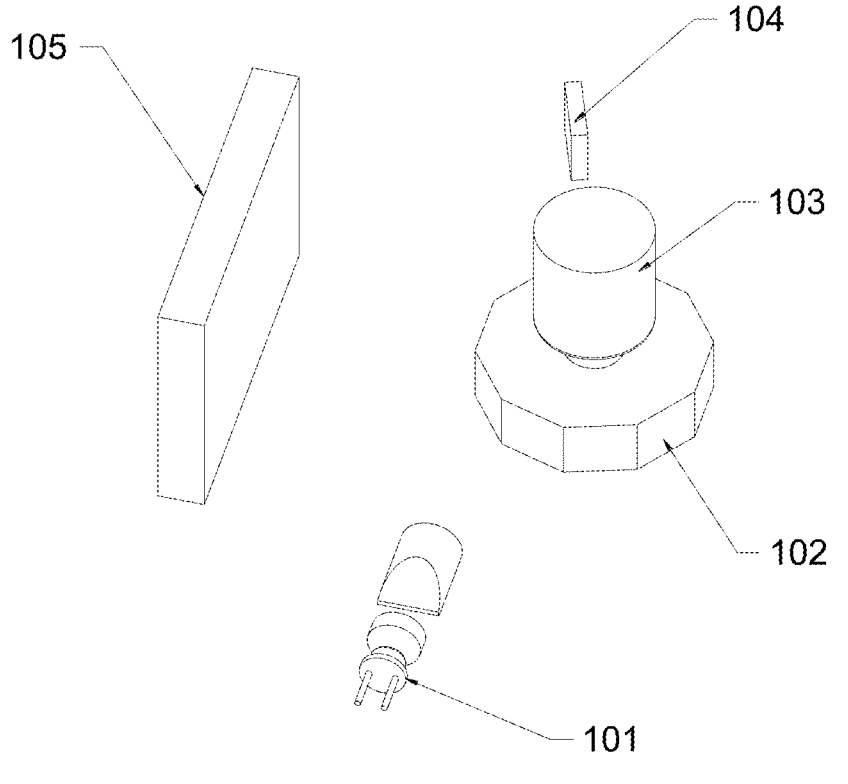

FIG. 2

Based on corrected coordinate information of the structured light, structure information of to-be-cast structured light is generated.  — B1

Based on the structure information, structured light casting is performed.  — B2

During the structured light casting process, image information of a scanned target irradiated by the structured light is collected.  — B3

Based on the image information, three-dimensional reconstruction is performed on the scanned target.  — B4

FIG. 5

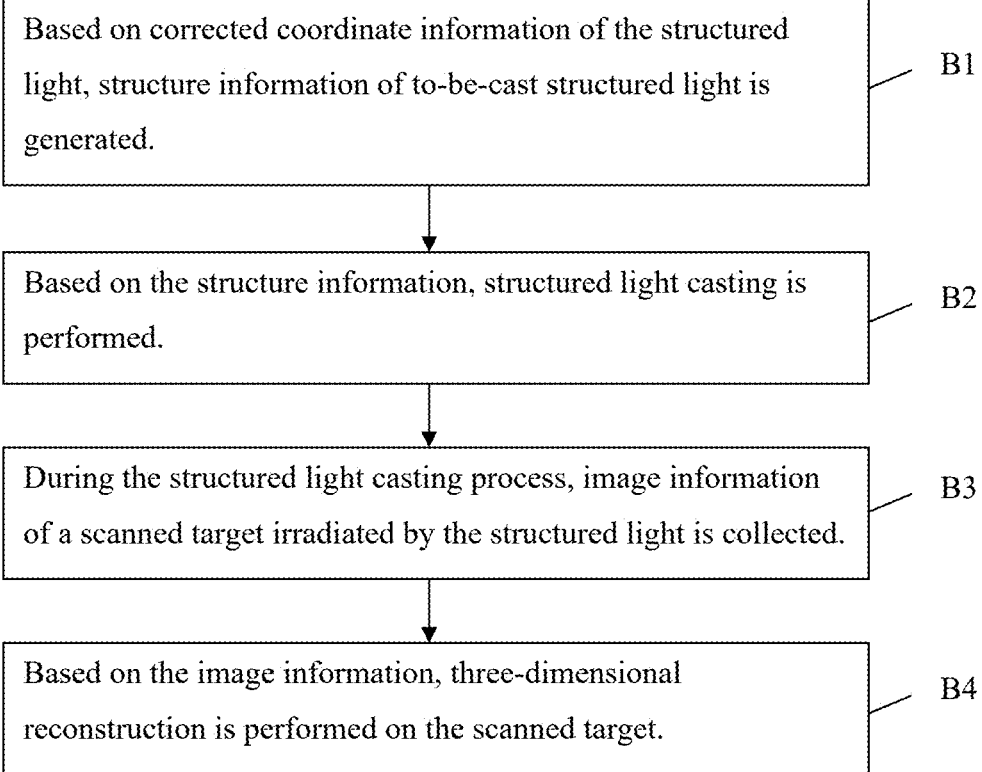

| i | ... | n | n+1 | n+2 | ... |
|---|-----|---|-----|-----|-----|
| P | ... | $P_n$ | $P_{n+1}$ | $P_{n+2}$ | ... |
| G | ... | $G_n$ | $G_{n+1}$ | $G_{n+2}$ | ... |

FIG. 6

ROTATION ANGLE CORRECTION METHOD, DEVICE OF ROTARY MIRROR, AND SCANNING METHOD AND SYSTEM

CROSS-REFERENCE TO RELATED APPLICATIONS

This patent application claims priority from China Patent Application No. 202311374350.X filed on Oct. 23, 2023, the entire content of which is incorporated as reference.

TECHNICAL FIELD

The present disclosure relates to the field of optical scanning technologies, in particular to a rotation angle correction method, a device of a rotary mirror, and a scanning method and system.

BACKGROUND OF THE INVENTION

Some of the existing optical scanning devices use a rotating multi-faceted reflector to cast light so as to perform scanning. These optical scanning devices usually use rotation graduation information of a rotary mechanism to determine a light-casting position so as to perform scanning analysis. But, in practice, the light-casting structures of these optical scanning devices usually have structural errors, such as a planar error of a reflector surface and an off-axis error of a rotation axis and the like, leading to a deviation of the light-casting position from expected. Therefore, these optical scanning devices cannot accurately determine a light-casting position based on the rotation graduation information of the rotary mechanism, affecting scanning analysis results.

For the above problem, there is no effective technical solution available until now.

SUMMARY OF THE INVENTION

The object of the present disclosure is to provide a rotation angle correction method and device of a rotary mirror and a scanning method and system to correct a light-casting position corresponding to rotation graduation information, so as to improve the scanning analysis accuracy of an optical scanning device.

According to a first aspect, the present disclosure provides a rotation angle correction method of a rotary mirror, which is applied to an optical scanning device. The optical scanning device is based on line laser irradiated onto a rotating multi-faceted reflector and then reflected to a scanned target so as to generate structured light. The correction method includes the following steps:

obtaining a plurality of light stripe images cast to a reference target screen under different graduations and corresponding rotation graduation information;

based on the light stripe images and corresponding rotation graduation information, obtaining a first mapping relationship; and based on the first mapping relationship and the rotation graduation information, correcting coordinate information of the structured light.

In the rotation angle correction method of the rotary mirror of the present disclosure, by using the light stripe images obtained based on the reference target screen and capable of representing the actual coordinate information of the structure light and corresponding rotation graduation information, the first mapping relationship is established and then based on the first mapping relationship, the coordinate information of the structured light corresponding to the rotation graduation information in the optical scanning device is corrected so as to optimize a scanning result and improve a scanning analysis accuracy.

In the rotation angle correction method of the rotary mirror, the step of obtaining the first mapping relationship based on the light stripe images and corresponding rotation graduation information includes:

based on the light stripe images, obtaining position information of each light stripe; and based on the position information of the light stripe of each light stripe image and corresponding rotation graduation information, establishing the first mapping relationship.

In the rotation angle correction method of the rotary mirror, there are a plurality of first mapping relationships that match mirror surface number information of different mirror surfaces.

The step of establishing the first mapping relationship based on the position information of the light stripe of each light stripe image and corresponding rotation graduation information includes:

based on the rotation graduation information, obtaining, by guidance, change information of the position information;

based on increase and decrease of the change information, distinguishing as a plurality of segments of change relationships; and based on each segment of change relationship, determining the mirror surface number information and corresponding first mapping relationship.

In the rotation angle correction method of the rotary mirror, each mirror surface of the multi-faceted reflector correspondingly generates a plurality of light stripe images.

In the rotation angle correction method of the rotary mirror, the step of obtaining a plurality of light stripe images cast to the reference target screen under different graduations and corresponding rotation graduation information includes:

based on a plurality of pieces of different preset rotation graduation information, enabling the line laser to generate light stripes in the reference target screen and obtain the light stripe images.

In the rotation angle correction method of the rotary mirror, the line laser is enabled briefly based on a preset time window period; the light stripe images perform image integral acquisition based on a line laser enabling time.

In the rotation angle correction method of the rotary mirror, the step of correcting the coordinate information of the structured light based on the first mapping relationship and the rotation graduation information includes:

based on the first mapping relationship and the rotation graduation information, determining the rotation graduation information corresponding to the coordinate information of all structured light.

According to a second aspect, the present disclosure further provides a scanning method, which is applied to an optical scanning device. The optical scanning device is based on line laser irradiated onto a rotating multi-faceted reflector and then reflected to a scanned target so as to generate structured light. The scanning method includes the following steps:

based on corrected coordinate information of the structured light, generating structure information of to-be-cast structured light;

based on the structure information, performing structured light casting;

during the structured light casting process, collecting image information of a scanned target irradiated by the structured light; and based on the image information, performing three-dimensional reconstruction on the scanned target.

The coordinate information of the structured light is corrected based on the following steps:

obtaining a plurality of light stripe images cast to a reference target screen under different graduations and corresponding rotation graduation information; and based on the light stripe images and corresponding rotation graduation information, obtaining a first mapping relationship; and based on the first mapping relationship and the rotation graduation information, correcting the coordinate information of the structured light.

The scanning method of the present disclosure is equivalent to that scanning analysis is performed based on the rotation angle correction method of the rotary mirror mentioned in the first aspect for correcting the coordinate information of the structured light corresponding to the rotation graduation information, so as to effectively reduce a scanning error resulting from an error of a rotary axis deviation in the optical scanning device and optimize scanning effect.

According to a third aspect, the present disclosure further provides a rotation angle correction device of a rotary mirror, which is applied to an optical scanning device. The optical scanning device is based on line laser irradiated onto a rotating multi-faceted reflector and then reflected to a scanned target so as to generate structured light. The correction device includes the following modules:

an obtaining module, configured to obtain a plurality of light stripe images cast to a reference target screen under different graduations and corresponding rotation graduation information;

a mapping module, configured to, based on the light stripe images and corresponding rotation graduation information, obtain a first mapping relationship; and a correcting module, configured to, based on the first mapping relationship and the rotation graduation information, correct coordinate information of the structured light.

In the rotation angle correction device of the rotary mirror of the present disclosure, by using the light stripe images obtained based on the reference target screen and capable of representing the actual coordinate information of the structure light and corresponding rotation graduation information, the first mapping relationship is established and then based on the first mapping relationship, the coordinate information of the structured light corresponding to the rotation graduation information in the optical scanning device is corrected so as to optimize a scanning result and improve a scanning analysis accuracy.

According to a fourth aspect, the present disclosure further provides a scanning system, comprising a controller. The controller is configured to perform the rotation angle correction method of the rotary mirror mentioned in the first aspect to correct the coordinate information of the structured light and/or perform the scanning method of the second aspect to generate a scanning result.

It can be known from the above that the present disclosure provides a rotation angle correction method and device of a rotary mirror, and a scanning method and system, where the rotation angle correction method uses the light stripe images obtained based on the reference target screen and capable of representing the actual coordinate information of the structure light and corresponding rotation graduation information to establish the first mapping relationship and based on the first mapping relationship, correct the coordinate information of the structured light corresponding to the rotation graduation information in the optical scanning device; and thus, the optical scanning device can, based on the corrected coordinate information of the structured light and the rotation graduation information, cast the structured light to irradiate the scanned target and collect images, so as to complete the scanning and thus optimize a scanning result and improve a scanning analysis accuracy.

BRIEF DESCRIPTION OF DRAWINGS

FIG. 1 is a flowchart illustrating a rotation angle correction method of a rotary mirror according to an embodiment of the present disclosure.

FIG. 2 is a structural schematic diagram illustrating a casting structure of an optical scanning device.

FIG. 5 is a flowchart illustrating a scanning method according to an embodiment of the present disclosure.

FIG. 6 is a diagram illustrating a relationship table of rotation graduation information, light stripe position information, and cast light brightness value.

Figure 3:
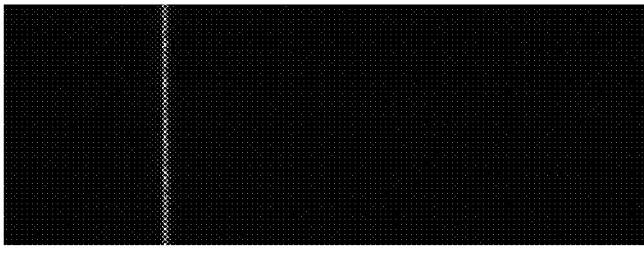
FIG. 3 is a schematic diagram of a light stripe image.

The numerals of the drawings are described below. 101: line laser assembly, 102: multi-prism reflector, 103: rotary mechanism, 104: image sensor, 105: reference target screen, 201: obtaining module, 202: mapping module, and 203: correcting module.

DETAILED DESCRIPTION OF PREFERRED EMBODIMENTS OF THE INVENTION

The technical solution in the embodiments of the present disclosure will be clearly and fully described below in combination with the drawings in the embodiments of the present disclosure. Apparently, the described embodiments are merely some embodiments of the present disclosure rather than all embodiments. Usually, the components of the embodiments of the present disclosure described and shown in the drawings herein can be arranged and designed in different configurations. Therefore, the detailed descriptions for the embodiments of the present disclosure provided in the drawings are not intended to limit the scope of protection of the present disclosure but only show some selected embodiments of the present disclosure. All other embodiments obtained by those skilled in the arts based on these embodiments of the present disclosure without making creative work shall all fall within the scope of protection of the present disclosure.

It should be noted that similar numerals and letters represent similar items in the following drawings. Therefore, once one item is defined in one drawing, it will not be further defined and explained in subsequent drawings. Furthermore, in the descriptions of the present disclosure, the terms such as "first" and "second" and the like are used only to make distinguishing descriptions and shall not be understood as indicating or implying relative importance.

In the first aspect, as shown in FIG. 1, some embodiments of the present disclosure provide a rotation angle correction method of a rotary mirror, which is applied to an optical scanning device. The optical scanning device is based on line laser irradiated onto a rotating multi-faceted reflector and then reflected to a scanned target so as to generate structured light. The correction method includes the following steps.

A1: A plurality of light stripe images cast to a reference target screen under different graduations and corresponding rotation graduation information are obtained.

A2: Based on the light stripe images and corresponding rotation graduation information, a first mapping relationship is obtained.

A3: Based on the first mapping relationship and the rotation graduation information, coordinate information of the structured light is corrected.

Specifically, the rotation angle correction method of the rotary mirror in the embodiments of the present disclosure is applicable to various types of optical scanning devices which use a rotary mirror to cast line laser to a to-be-scanned scanned target so as to perform scanning. FIG. 2 illustrates a casting structure of an optical scanning device. The casting structure uses a continuously-rotating multi-faceted reflector to change a casting position of the line laser. The structure includes a line laser assembly 101, a multi-faceted reflector, a rotary mechanism 103, and an image sensor 104. Line laser is output toward the multi-faceted reflector by using the line laser assembly 101 and then reflected by the multi-faceted reflector to a scanned target so as to generate structured light. Then, the image sensor 104 collects structured light images and performs analysis. The multi-faceted reflector continuously rotates under the action of the rotary mechanism 103 to change a casting position of the line laser, such that the image sensor 104 collects continuously-changing structured light images, so as to achieve scanning analysis for the scanned target.

More specifically, the multi-faceted reflector in FIG. 2 is a multi-prism reflector 102, and the scanned target in FIG. 2 is the reference target screen 105 which is a panel with a uniform plane, preferably, a projection screen capable of highlighting light stripes clearly (enabling the light stripes to have a high contrast in the reference target screen 105). When it is required to perform an actual scan, the scanned target may be changed to another to-be-scanned object based on the position of the reference target screen 105.

More specifically, the reference target screen 105 can clearly reflect the casting position and change circumstance of the line laser under the casting action of the line laser; the multi-faceted reflector continuously rotates to change an incident position of the line laser thereon and thus change the casting position of the line reflected light generated by the line laser on the reference target screen. Therefore, the casting position of the line laser is associated with the rotation circumstance of the multi-faceted reflector. The existing optical scanning device usually obtains a line laser casting position based on the structure of the multi-faceted reflector and the rotation graduation information and determines the coordinate of the structured light. The rotation graduation information is data information reflecting a current rotation pose of the multi-faceted reflector or pose information or deflection angle information of the multi-faceted reflector or rotation angle information or relevant drive data information of the rotary mechanism 103. Since the rotation graduation information can reflect a pose relationship between the multi-faceted reflector and the line laser assembly 101, it can reflect the position (coordinate information) of the structured light. The rotation angle correction method of the rotary mirror in the embodiments of the present disclosure is intended to, in a case of considering factors, for example, various factors (e.g. off-axis error) with the optical scanning device, correct a correspondence between rotation graduation information and structured light position to calibrate a correct relationship between the rotation graduation information and the coordinate information of the structured light, so as to improve the accuracy of the scanning result of the optical scanning device to which the method is applied.

More specifically, the step A1 is to obtain light stripe images and corresponding rotation graduation information based on graduation, namely, is a process of obtaining light stripe images based on rotation graduation information and recording the rotation graduation information, which is equivalent to, with the rotation graduation information as identification data, triggering the optical scanning device to obtain corresponding light stripe images. Preferably, when the rotary mechanism 103 drives the multi-faceted reflector to rotate, a plurality of light stripe images tracking change of the rotation graduation information are photographed and obtained. This obtaining process may be obtaining a plurality of light stripe images corresponding to some preset rotation graduation information or may be photographing and obtaining a plurality of light stripe images based on a preset graduation interval or preset time interval or another specific change form to obtain sufficient light stripe images and corresponding rotation graduation information for analyzing the first mapping relationship.

More specifically, in the embodiments of the present disclosure, a plurality of light stripe images obtained in step A1 are obtained based on at least one turn that the multi-faceted reflector rotates, so as to obtain the light stripe images capable of representing the reflection characteristics of all mirror surfaces.

More specifically, based on the plane characteristics of the reference target screen 105, the line laser cast onto the reference target screen 105 is expressed as light stripes.

More specifically, since the light stripes in the light stripe images on the reference target screen 105 reflect the actual casting position of the line laser, an actual correspondence (i.e., first mapping relationship) therebetween is established based on the light stripe position in the light stripe images and corresponding rotation graduation information in the step A2. The relationship may be in the form of a mapping diagram, mapping table, transformation formula, and the like which can be used to clearly define a matching relationship therebetween. In this case, the optical scanning device can, in an actual scanning process, obtain the actual casting position (i.e., the coordinate information of the structured light in the structured light images) of the line laser based on the rotation graduation information and also obtain corresponding rotation graduation information based on the coordinate information of the structured light. Therefore, in step A3, the coordinate information of the structured light corresponding to each piece of rotation graduation information is determined or corrected based on the first mapping relationship.

In the rotation angle correction method of the rotary mirror in the embodiments of the present disclosure, the light stripe images obtained based on the reference target screen and capable of representing the actual coordinate information of the structure light and corresponding rotation graduation information are used to establish the first mapping relationship and based on the first mapping relationship, the coordinate information of the structured light corresponding to the rotation graduation information in the optical scanning device is corrected; and thus, the optical scanning device can, based on the corrected coordinate information of the structured light and the rotation graduation information, cast the structured light to irradiate the scanned target and collect images, so as to complete the scanning and thus optimize a scanning result and improve a scanning analysis accuracy.

In some preferred embodiments, the step of obtaining the first mapping relationship based on light stripe images and corresponding rotation graduation information includes the following steps:

A21: obtaining position information of each light stripe based on the light stripe images; and A22: based on the position information of the light stripe of each light stripe image and corresponding rotation graduation information, establishing the first mapping relationship.

In some preferred embodiments, there are a plurality of first mapping relationships which match mirror surface number information of different mirror surfaces.

The step of establishing the first mapping relationship based on the position information of the light stripe of each light stripe image and corresponding rotation graduation information includes:

A221: based on the rotation graduation information, obtaining, by guidance, change information of the position information; and A222: based on increase and decrease of the change information, distinguishing as a plurality of segments of change relationships; and A223: based on each segment of change relationship, determining the mirror surface number information and corresponding first mapping relationship.

More specifically, the mirror surface number information is an identification number of the mirror surface of the multi-faceted reflector.

Figure 4:
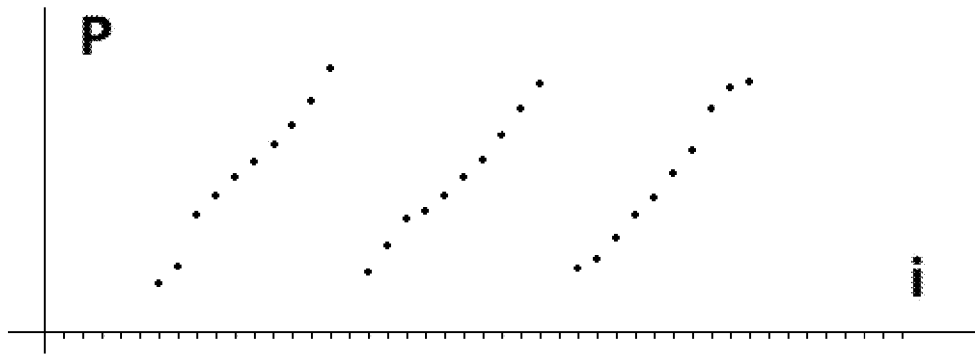
FIG. 4 is a diagram illustrating a coordinate relationship of rotation graduation information and light stripe position information.

More specifically, the change information obtained in step A221 may be an image or table established for the position information based on the rotation graduation information. Since the multi-faceted reflector rotates along a fixed rotation direction, the line laser can be reflected by one mirror surface of the multi-faceted reflector to the scanned target and then propagated along a specific direction. Therefore, for one mirror surface, if the position information is represented by a one-dimensional coordinate, the position information will only increase or decrease gradually depending on the change of the rotation graduation information. As shown in FIG. 4, i refers to the rotation graduation information and P refers to the position information of the light stripe. When the line laser is switched from the mirror surface to another one for casting, the position information will instantaneously change accordingly. Therefore, the increase or decrease of the change information can directly reflect the reflection effect of different mirror surfaces such that, in step A222, the rotation graduation information and the position information can be divided into several segments of matching relationships based on the change information, and based on several segments of matching relationships, multiple first mapping relationships and mirror surface number information can be obtained. The mirror surface number information may be set based on an obtaining sequence of the first mapping relationship or based on a calibration relationship of rotation graduation information and mirror surface.

In some preferred embodiments, the step of obtaining a plurality of light stripe images cast to the reference target screen under different graduations and corresponding rotation graduation information includes:

A11: based on a plurality of pieces of different preset rotation graduation information, enabling the line laser to generate light stripes in the reference target screen 105 and obtain the light stripe images.

It should be noted that performing the step A11 is triggered based on the preset rotation graduation information while the rotation graduation information is recorded as the rotation graduation information corresponding to the light stripe images.

It is further noted that as shown in FIG. 3, the light stripe images are integral images where the line laser is enabled to generate the cast light on the reference target screen 105.

In some preferred embodiments, the line laser is enabled briefly based on a preset time window period; and the light stripe images are obtained by performing image integration based on a line laser enabling time.

Specifically, the time window period of enabling the line laser determines a width of the light stripes. In the embodiments of the present disclosure, the time window period is set based on a scanning resolution of the optical scanning device and a rotation speed of the multi-faceted reflector so as to obtain the light stripe images which have proper pixel width and can clearly reflect the position information of the light stripes. In some preferred embodiments, the step of correcting the coordinate information of the structured light based on the first mapping relationship and the rotation graduation information includes:

A31: based on the first mapping relationship and the rotation graduation information, determining the rotation graduation information corresponding to the coordinate information of all structured light.

In the second aspect, as shown in FIG. 5, some embodiments of the present disclosure further provide a scanning method, which is applied to an optical scanning device. The optical scanning device is based on line laser irradiated onto a rotating multi-faceted reflector and then reflected to a scanned target so as to generate structured light. The scanning method includes the following steps.

B1: Based on corrected coordinate information of the structured light, structure information of to-be-cast structured light is generated.

B2: Based on the structure information, structured light casting is performed.

B3: During the structured light casting process, image information of a scanned target irradiated by the structured light is collected.

B4: Based on the image information, three-dimensional reconstruction is performed on the scanned target.

The coordinate information of the structured light is corrected based on the following steps:

obtaining a plurality of light stripe images cast to a reference target screen under different graduations and corresponding rotation graduation information;

based on the light stripe images and corresponding rotation graduation information, obtaining a first mapping relationship; and based on the first mapping relationship and the rotation graduation information, correcting the coordinate information of the structured light.

Specifically, the process of performing three-dimensional reconstruction in step B4 includes: based on image information, obtaining cast light brightness values generated by different structured light cast on the scanned target, and then based on the cast light brightness values, a canning result is generated to perform three-dimensional reconstruction.

The process of obtaining the cast light brightness values includes: based on the corrected coordinate information of the structured light, extracting corresponding structured light information from the structured light image information and substituting the structured light information into a preset structured light calculation formula to obtain a corresponding cast light brightness value.

As shown in FIG. 6, if the corrected coordinate information of the structured light is obtained based on the rotation graduation information and based on the coordinate information of these structured light, the morphology of the complete structured light images is analyzed to generate a scanning result, the first mapping relationship is preferably represented as a table. As shown herein, i refers to the rotation graduation information, n, n+1, and n+2 refer to the numbers of the rotation graduation information, P refers to the light stripe position information calculated by analyzing and calculating light stripe images, and G refers to the cast light brightness value obtained based on P and the structured light image information. Therefore, the scanning method of the embodiments of the present disclosure can perform scanning analysis based on the corrected coordinate information of the structured light corresponding to the preset rotation graduation information.

More specifically, the structure information is cast control information of the structured light having a regular brightness change trend, for example, a change curve of the brightness over time, which is used to control the output power of a laser device to change the intensity of the line laser. Bright zones and dark zones generated by one mirror surface in one round of reflection are alternated and each bright zone has the same coverage scope.

More specifically, based on the structure information, the structured light cast is controlled such that the laser device can be controlled to generate line laser changing with the brightness matching the structure information. In this case, each mirror surface of the multi-faceted reflector can generate a plurality of bright zones capable of representing line structured light separately in each round of reflection and on this basis, image integration is performed to obtain image information with surface structured light. Thus, the multi-faceted reflector can, in each round of rotation, generate more structured light data for analyzing surface characteristics of the scanned target, greatly improving the generation efficiency of the structured light and hence increasing the three-dimensional scanning efficiency.

In some preferred embodiments, the structure information is a cosine wave or square wave-shaped brightness change function.

Figure 8:
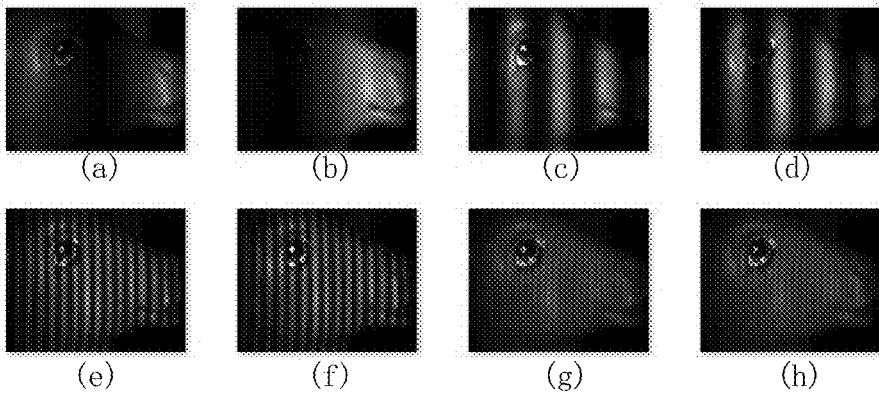
FIG. 8 is an image sequence generated by performing structured light casting based on different structure information.

Specifically, as shown in FIG. 8, different types of structured light images can be generated based on different structure information. The method of obtaining the structured light images in the embodiments of the present disclosure may be casting the structured light based on one or more pieces of structure information in FIG. 8 in the three-dimensional scanning process.

The scanning method of the embodiments of the present disclosure is equivalent to that scanning analysis is performed based on the rotation angle correction method of the rotary mirror mentioned in the first aspect for correcting the coordinate information of the structured light corresponding to the rotation graduation information, so as to effectively reduce a scanning error resulting from an error of a rotary axis deviation in the optical scanning device and optimize scanning effect.

Figure 7:
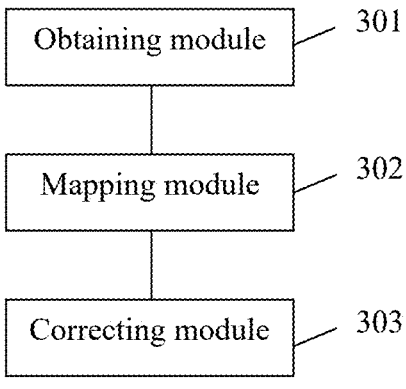
FIG. 7 is a structural schematic diagram illustrating a rotation angle correction device of a rotary mirror according to an embodiment of the present disclosure.

In the third aspect, as shown in FIG. 7, some embodiments of the present disclosure further provide a rotation angle correction device of a rotary mirror, which is applied to an optical scanning device. The optical scanning device is based on line laser irradiated onto a rotating multi-faceted reflector and then reflected to a scanned target so as to generate structured light. The correction device includes the following modules:

an obtaining module 301, configured to obtain a plurality of light stripe images cast to a reference target screen under different graduations and corresponding rotation graduation information;

a mapping module 302, configured to, based on the light stripe images and corresponding rotation graduation information, obtain a first mapping relationship; and a correcting module 303, configured to, based on the first mapping relationship and the rotation graduation information, correct coordinate information of the structured light.

The rotation angle correction device of the rotary mirror in the embodiments of the present disclosure uses the light stripe images obtained based on the reference target screen and capable of representing the actual coordinate information of the structure light and corresponding rotation graduation information to establish the first mapping relationship and based on the first mapping relationship, correct the coordinate information of the structured light corresponding to the rotation graduation information in the optical scanning device; and thus, the optical scanning device can, based on the corrected coordinate information of the structured light and the rotation graduation information, cast the structured light to irradiate the scanned target and collect images, so as to complete the scanning and thus optimize a scanning result and improve a scanning analysis accuracy.

In some preferred embodiments, the rotation angle correction device of the rotary mirror in the embodiments of the present disclosure is used to perform the rotation angle correction method of the rotary mirror mentioned in the first aspect.

In the fourth aspect, some embodiments of the present disclosure further provide a scanning system, including a controller. The controller is configured to perform the rotation angle correction method of the rotary mirror mentioned in the first aspect to correct the coordinate information of the structured light and/or perform the scanning method of the second aspect to generate a scanning result.

Specifically, the scanning system includes the above optical scanning device. The image sensor 104 is configured to generate structured light image information about the scanned target.

In accordance with a preferred embodiment of the present application, the rotary mirror rotates at a high speed, preferably at least 1,000 rpm, more preferably 2,000-4000, rpm, and in particular about 3000 rpm. In contrast, the rotation speed of the rotary mirror disclosed in earlier publications, is relatively slow, namely, 2~4 rpm (revolutions/minute). Hence, based on the earlier publications, the three-dimensional data on a light strip must be calculated each time to acquire an image. Then the rotary mirror moves to the next position, and then the image is collected, and the three-dimensional data on the next light strip is obtained. The data obtained twice in this way need to be spliced together. Therefore, the scanning equipment is required not to move, and neither does the object being scanned. Otherwise, large deviations would occur. In comparison, the embodiments disclosed in the present application can solve the mobile problem very well by making a handheld device possible because of the high rotation speed of the rotary mirror and fast acquisition of images.

In conclusion, the embodiments of the present disclosure provide a rotation angle correction method and device of a rotary mirror, and a scanning method and system, where the rotation angle correction method uses the light stripe images obtained based on the reference target screen and is capable of representing the actual coordinate information of the structure light and corresponding rotation graduation information to establish the first mapping relationship and based on the first mapping relationship, correct the coordinate information of the structured light corresponding to the rotation graduation information in the optical scanning device; and thus, the optical scanning device can, based on the corrected coordinate information of the structured light and the rotation graduation information, cast the structured light to irradiate the scanned target and collect images, so as to complete the scanning and thus optimize a scanning result and improve a scanning analysis accuracy.

In the embodiments of the present disclosure, it should be understood that the disclosed device and method may be implemented in another way. The above-described device embodiments are only illustrative. For example, the unit division is only a logical function division and in practical implementation, may be another division. For another example, multiple units or components may be combined or integrated into another system or some features may be neglected or not implemented. Furthermore, mutual coupling, direct coupling, or communication connection shown or discussed may be indirect coupling or communication connection between devices or units via some communication interfaces, or be in the electrical, or mechanical form or the like.

Furthermore, units described as separate members may be or may not be physically separated, and the members displayed as units may be or not be physical units, namely, may be located in one place or distributed to a plurality of network units. All or part of the units may be selected based on actual requirements to achieve the object of the solutions of the embodiments of the present disclosure.

Furthermore, the functional modules in the embodiments of the present disclosure may be integrated together to form one independent part or each module exists separately, or two or more modules are integrated together to form one independent part.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Herein, the relational terms such as first, second and the like are used only to distinguish one entity or operation from another one rather than necessarily require or imply presence of such actual relation or sequence between these entities or operations.

Terms and phrases used in this document, and variations thereof, unless otherwise expressly stated, should be construed as open-ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts, and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The above descriptions are only the embodiments of the present disclosure and not intended to limit the scope of protection of the present disclosure. Those skilled in the arts can make various changes and modifications to the present disclosure. Any changes, equivalent substitutions and improvements made within the spirit and principle of the present disclosure shall all be incorporated in the scope of protection of the present disclosure.

What is claimed is:

1. A rotation angle correction method of a rotary mirror, applied to an optical scanning device, wherein the optical scanning device is based on line laser irradiated onto a rotating multi-faceted reflector and then reflected to a scanned target so as to generate structured light, and the correction method comprises the following steps:

obtaining a plurality of light stripe images cast to a reference target screen under different graduations and corresponding rotation graduation information;

based on the light stripe images and corresponding rotation graduation information, obtaining a first mapping relationship;

based on the first mapping relationship and the rotation graduation information, correcting coordinate information of the structured light.

2. The rotation angle correction method of claim 1, wherein, the step of obtaining the first mapping relationship based on the light stripe images and corresponding rotation graduation information comprises:

based on the light stripe images, obtaining position information of each light stripe;

based on the position information of the light stripe of each light stripe image and corresponding rotation graduation information, establishing the first mapping relationship.

3. The rotation angle correction method of claim 2, wherein there are a plurality of first mapping relationships that match mirror surface number information of different mirror surfaces;

the step of establishing the first mapping relationship based on the position information of the light stripe of each light stripe image and corresponding rotation graduation information comprises:

based on the rotation graduation information, obtaining, by guidance, change information of the position information;

based on increase and decrease of the change information, distinguishing as a plurality of segments of change relationships;

based on each segment of change relationship, determining the mirror surface number information and corresponding first mapping relationship.

4. The rotation angle correction method of claim 1, wherein each mirror surface of the multi-faceted reflector correspondingly generates a plurality of light stripe images.

5. The rotation angle correction method of claim 1, wherein the step of obtaining a plurality of light stripe images cast to the reference target screen under different graduations and corresponding rotation graduation information comprises:

based on a plurality of pieces of different preset rotation graduation information, enabling the line laser to generate light stripes in the reference target screen and obtain the light stripe images.

6. The rotation angle correction method of claim 5, wherein the line laser is enabled briefly based on a preset time window period; the light stripe images perform image integral acquisition based on a line laser enabling time.

7. The rotation angle correction method of claim 1, wherein the step of correcting the coordinate information of the structured light based on the first mapping relationship and the rotation graduation information comprises:

based on the first mapping relationship and the rotation graduation information, determining the rotation graduation information corresponding to the coordinate information of all structured light.

8. A scanning system, comprising a controller, wherein the controller is configured to perform the rotation angle correction method of the rotary mirror of claim 1 to correct the coordinate information of the structured light.

9. A scanning method, applied to an optical scanning device, wherein the optical scanning device is based on line laser irradiated onto a rotating multi-faceted reflector and then reflected to a scanned target so as to generate structured light, and the scanning method comprises the following steps:

based on corrected coordinate information of the structured light, generating structure information of to-be-cast structured light;

based on the structure information, performing structured light casting;

during the structured light casting process, collecting image information of a scanned target irradiated by the structured light; and based on the image information, performing three-dimensional reconstruction on the scanned target;

the coordinate information of the structured light is corrected based on the following steps:

obtaining a plurality of light stripe images cast to a reference target screen under different graduations and corresponding rotation graduation information;

based on the light stripe images and corresponding rotation graduation information, obtaining a first mapping relationship; and based on the first mapping relationship and the rotation graduation information, correcting the coordinate information of the structured light.

10. The method of claim 9 wherein the optical scanning device comprises a rotary mirror, and the method comprises rotating the rotary mirror at a speed of at least 1,000 rpm during the structured light casting process.

11. A scanning system, comprising a controller, wherein the controller is configured to perform the scanning method of claim 9 to generate a scanning result.

12. A rotation angle correction device of a rotary mirror, applied to an optical scanning device, wherein the optical scanning device is based on line laser irradiated onto a rotating multi-faceted reflector and then reflected to a scanned target so as to generate structured light, and the correction device comprises the following modules:

an obtaining module, configured to obtain a plurality of light stripe images cast to a reference target screen under different graduations and corresponding rotation graduation information;

a mapping module, configured to, based on the light stripe images and corresponding rotation graduation information, obtain a first mapping relationship; and a correcting module, configured to, based on the first mapping relationship and the rotation graduation information, correct coordinate information of the structured light.

* * * * *